(12) United States Patent
  Vikor

(10) Patent No.: US 9,977,157 B2
(45) Date of Patent: *May 22, 2018

(54) DIELECTRIC MIRROR

(71) Applicant: Centre Luxembourgeois de Recherches Pour le Verre et la Ceramique (CRVC) SaRL, Dudelange (LU)

(72) Inventor: Gyorgy Vikor, Oroshaza (HU)

(73) Assignee: Guardian Europe S.à r.l., Bertrange (LU)

( * ) Notice: Subject to any disclaimer, the term of this patent is extended or adjusted under 35 U.S.C. 154(b) by 443 days.

This patent is subject to a terminal disclaimer.

(21) Appl. No.: 13/766,025

(22) Filed: Feb. 13, 2013

(65) Prior Publication Data
US 2014/0226208 A1 Aug. 14, 2014

(51) Int. Cl.
  *G02B 5/08* (2006.01)
  *C03C 17/34* (2006.01)
  *C03C 17/36* (2006.01)

(52) U.S. Cl.
  CPC ........ *G02B 5/0833* (2013.01); *C03C 17/3417* (2013.01); *C03C 17/3423* (2013.01); *C03C 17/3663* (2013.01); *G02B 5/0816* (2013.01); *G02B 5/0825* (2013.01); *G02B 5/0841* (2013.01)

(58) Field of Classification Search
  CPC .. G02B 1/10; G02B 1/11; G02B 1/115; G02B 5/08; G02B 5/0816; G02B 5/0825; G02B 5/0833; G02B 5/0841
  USPC ................. 359/359, 584, 586, 588
  See application file for complete search history.

(56) References Cited

U.S. PATENT DOCUMENTS

| | | | |
|---|---|---|---|
| 5,372,874 A * | 12/1994 | Dickey | C03C 17/3417 204/192.27 |
| 5,450,238 A | 9/1995 | Bjornard et al. | |
| 5,543,229 A | 8/1996 | Ohsaki et al. | |
| 5,891,556 A | 4/1999 | Anderson et al. | |
| 6,337,124 B1 * | 1/2002 | Anderson | B32B 17/10036 427/419.1 |
| 6,532,112 B2 | 3/2003 | Chu | |

(Continued)

FOREIGN PATENT DOCUMENTS

EP  1 923 362  5/2008
EP  1 942 356  7/2008

(Continued)

OTHER PUBLICATIONS

"Optical Properties of Sputtered Multilayer Dielectric Mirrors", Motovilov, Soviet Journal of Optical Technology, American Institute of Physics, New York, vol. 34, No. 5, Sep. 1, 1967, pp. 595-599.

(Continued)

*Primary Examiner* — Nicholas R Pasko
(74) *Attorney, Agent, or Firm* — Nixon & Vanderhye P.C.

(57) ABSTRACT

A dielectric mirror includes a coating having alternating high and low index layers. The mirror coating has no metallic reflective layer, and may have film side and/or glass side visible reflection of from about 50-90% (more preferably from about 60-80% and most preferably from about 65-75%) and visible transmission of from about 10-50% (more preferably from about 20-40%, and most preferably from about 25-35%).

31 Claims, 2 Drawing Sheets

(56) References Cited

U.S. PATENT DOCUMENTS

| | | | |
|---|---|---|---|
| 6,894,838 B2 * | 5/2005 | Mizrahi | G02B 5/0833 359/584 |
| 6,903,512 B2 * | 6/2005 | Ohta | C03C 17/3417 315/169.1 |
| 7,251,074 B2 * | 7/2007 | Shimoda | G02B 5/0242 359/455 |
| 8,045,269 B2 * | 10/2011 | Akiya | G02B 5/285 359/582 |
| 9,594,195 B2 * | 3/2017 | Vikor | G02B 5/0833 |
| 2002/0001724 A1 | 1/2002 | Anderson et al. | |
| 2003/0146709 A1 | 8/2003 | Ohta et al. | |
| 2003/0180547 A1 * | 9/2003 | Buhay | B32B 17/10036 428/434 |
| 2007/0127126 A1 | 6/2007 | Terada | |
| 2009/0002830 A1 * | 1/2009 | Okamoto | G02B 5/28 359/589 |
| 2009/0153953 A1 * | 6/2009 | Banerjee | G02B 5/0833 359/359 |
| 2009/0237782 A1 * | 9/2009 | Takamatsu | B32B 17/10 359/359 |
| 2010/0188737 A1 * | 7/2010 | Terada | G02B 5/0833 359/359 |
| 2010/0310247 A1 * | 12/2010 | Oshima | G03B 13/00 396/106 |
| 2011/0096391 A1 * | 4/2011 | Kanai | F24J 2/1057 359/360 |
| 2011/0164157 A1 | 7/2011 | Katsuda | |
| 2012/0177899 A1 | 7/2012 | Unquera et al. | |
| 2013/0128342 A1 * | 5/2013 | Mitarai | B32B 17/10036 359/359 |
| 2013/0242381 A1 * | 9/2013 | Pudleiner | B32B 27/08 359/359 |

FOREIGN PATENT DOCUMENTS

| | | |
|---|---|---|
| JP | 58-11901 | 1/1983 |
| JP | 2002-182020 | 6/2002 |

OTHER PUBLICATIONS

International Search Report dated Dec. 5, 2014.

* cited by examiner

DIELECTRIC MIRROR

FIELD OF THE INVENTION

Certain example embodiments of this invention relate to dielectric mirrors and/or methods of making the same. More particularly, certain example embodiments relate to dielectric mirrors having no metallic reflective layer and which realize film side and/or glass side visible reflection of from about 50-90% (more preferably from about 60-80% and most preferably from about 65-75%) and visible transmission of from about 10-50% (more preferably from about 20-40%, and most preferably from about 25-35%).

BACKGROUND AND SUMMARY OF EXAMPLE EMBODIMENTS OF THE INVENTION

Mirrors have been in existence for years and have been used in many applications. Mirrors generally are either (a) first surface mirrors, where the mirror coating is provided between the viewer and the supporting glass substrate, or (b) second surface mirrors, where the supporting glass substrate is interposed between the viewer and the mirror coating. See, for example, U.S. Pat. Nos. 7,276,289 and 7,678,459; U.S. Publication Nos. 2006/0077580; 2007/0178316; 2008/0073203; 2008/0164173; 2010/0229853; 2011/0176212; and 2011/0176236. The entire contents of each of these patent documents are hereby incorporated herein by reference.

Mirrors often require the use of a metallic Al or Ag) reflective layer. However, it would be desirable if mirrors could be provided without the need for a metallic reflective layer.

Certain example embodiments of this invention relate to dielectric mirrors and/or methods of making the same. More particularly, certain example embodiments relate to dielectric mirrors having no metallic reflective layer (e.g., no Ag layer and no Al layer) and which are nonetheless capable of realizing film side and/or glass side visible reflection of from about 50-90% (more preferably from about 60-80% and most preferably from about 65-75%) and visible transmission of from about 10-50% (more preferably from about 20-40%, and most preferably from about 25-35%). The dielectric mirrors may be first or second surface mirrors in certain example embodiments, given good performance regarding both glass side reflection and film side reflection. The mirrors may or may not be heat treated (e.g., thermally tempered and/or thermally bent) in certain example embodiments. In certain example instances, such dielectric mirrors may be used in consumer, commercial and/or digital signage applications such as picture frames, bathroom mirrors, TVs, and/or electronic devices.

In certain example embodiments of this invention, there is provided a dielectric mirror including a glass substrate supporting a coating, the coating comprising moving away from the glass substrate: a first transparent dielectric high refractive index layer comprising niobium oxide, the first transparent dielectric high refractive index layer having a thickness of from about 70-140 nm; a second transparent dielectric low refractive index layer comprising silicon oxide, the second transparent dielectric low refractive index layer having a thickness of from about 30-140 nm; a third transparent dielectric high refractive index layer comprising niobium oxide; a fourth transparent dielectric low refractive index layer comprising silicon oxide; a fifth transparent dielectric high index layer comprising niobium oxide; wherein the first transparent dielectric high index layer comprising niobium oxide is at least 10 nm thicker than one or both of the third transparent dielectric high refractive index layer comprising niobium oxide and/or the fifth transparent dielectric high index layer comprising niobium oxide; wherein the coating does not contain any metallic reflective layer; and wherein the dielectric mirror has a visible film side reflectance and/or a visible glass side reflectance of from about 50-90%, and visible transmission of from about 20-40%.

In certain example embodiments of this invention, there is provided a mirror including a substrate (e.g., glass substrate) supporting a coating, the coating comprising moving away from the substrate: a first dielectric layer having a thickness of from about 70-140 nm and a refractive index (n) of from about 2.15 to 2.5; a second dielectric layer comprising silicon oxide; a third dielectric layer having a refractive index of from about 2.15 to 2.5; a fourth dielectric layer comprising silicon oxide; a fifth dielectric layer having a refractive index of from about 2.15 to 2.5; wherein the first dielectric layer is at least 10 nm thicker than one or both of the third dielectric layer and/or the fifth dielectric layer; wherein the coating does not contain any metallic reflective layer; and wherein the mirror has a visible film side reflectance and/or a visible glass side reflectance of from about 50-90%, and visible transmission of from about 20-40%.

DETAILED DESCRIPTION OF EXAMPLE EMBODIMENTS OF THE INVENTION

Figure 1:
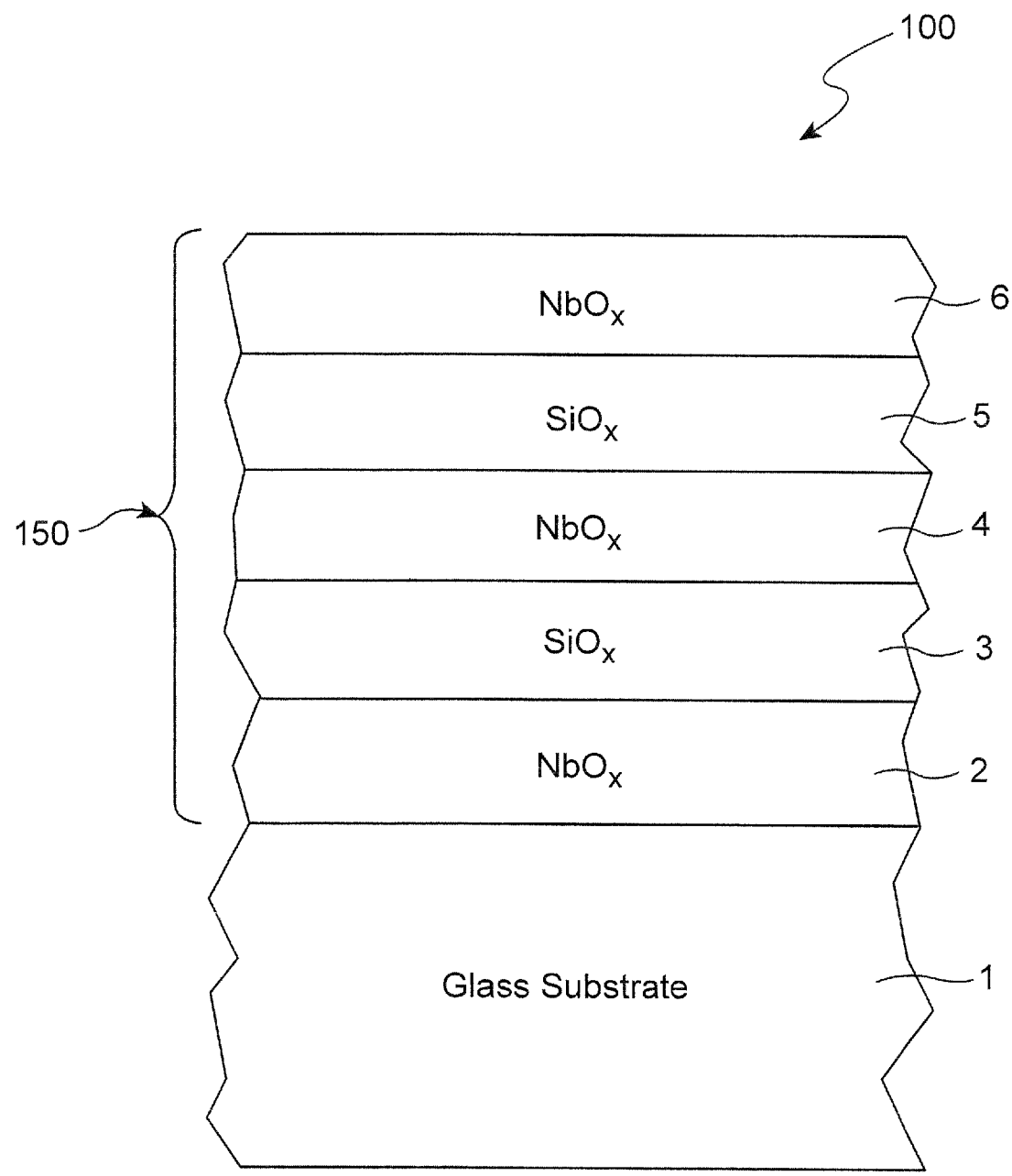
FIG. 1 is a cross sectional view of a dielectric mirror according to an example embodiment of this invention.

Referring now more particularly to the drawings in which reference numerals indicate like parts/materials throughout the several views.

FIG. 1 is a cross sectional view of a dielectric mirror 100 according to certain example embodiments of this invention. The mirror includes a dielectric coating 150 which is on a glass substrate 1. Glass substrate 1 may be soda-lime-silica based glass or any other suitable type of glass, and may be from about 1-10 mm thick, more preferably from about 2-6 mm thick, in example embodiments of this invention. Alternatively, substrate 1 may be of quartz, silicon, or the like. The mirror coating 150 includes high index transparent dielectric layers 2, 4 and 6 of or including niobium oxide (e.g., $Nb_2O_5$, $NbO_2$ and/or NbO) and low index transparent dielectric layers 3 and 5 of or including silicon oxide (e.g., $SiO_2$ which may or may not be doped with aluminum and/or nitrogen). In certain example embodiments, one or both of the silicon oxide layers 3 and/or 5 may be doped with other material such as from about 1-8% aluminum and/or from about 1-10% nitrogen. One or more of layers 2, 4 and 6 may also be doped with other material in certain example instances. In the FIG. 1 embodiment, layer 6 is the outermost layer of the coating 150 and may be exposed to air. Each of layers 2-6 is considered "transparent" because each of these layers, standing alone, is substantially transparent to visible light (e.g., at least about 50% transparent, more preferably at least about 60% or 70% transparent to visible light).

High index transparent dielectric layers 2, 4 and 6 of or including niobium oxide may have a refractive index (n) of from about 2.15 to 2.5, more preferably from about 2.2 to 2.4, and most preferably from about 2.25 to 2.35 (at 550 nm). In certain alternative embodiments, the niobium oxide may be replaced with titanium oxide (e.g., $TiO_2$), zirconium oxide, hafnium oxide (e.g., $HfO_2$), cerium oxide (e.g., $CeO_2$), zinc sulfide, or bismuth oxide (e.g., $Bi_2O_3$) in one or more of high index layers 2, 4 and/or 6. Low index transparent dielectric layers 3 and 5 of or including silicon oxide may have a refractive index (n) of from about 1.4 to 1.7, more preferably from about 1.4 to 1.6, and most preferably from about 1.45 to 1.55 (all refractive index n values herein are measured at 550 nm).

Transparent dielectric layers 2-6 are preferably deposited by sputtering in example embodiments of this invention. For example, transparent dielectric layers 2, 4 and 6 of or including niobium oxide may be sputter deposited via at least one sputtering target of or including Nb, via sputtering in an atmosphere including a mixture of argon and reactive oxygen gases. And for example, transparent dielectric layers 3 and 5 of or including silicon oxide may be sputter deposited via at least one sputtering target of or including Si or SiAl, via sputtering in an atmosphere including a mixture of argon and reactive oxygen gases. Rotation C-Mag sputtering targets, or other types of targets, may be used. In sputtering operations, sufficient reactive oxygen gas may be used to achieve the refractive index values discussed herein. Ceramic targets may alternatively be used to sputter deposit one or more of these layers. While layers 2-6 are preferably deposited via sputtering, it is possible that they may be deposited via other techniques in alternative embodiments of this invention. While mirror coating 150 consists of five layers in the FIG. 1 embodiment, it is possible that additional layers may be provided in alternative embodiments.

Dielectric mirror 100, in the FIG. 1 embodiment and in other example embodiments, contains no metallic reflective layer (e.g., no Ag layer and no Al layer), but is nonetheless capable of realizing film side and/or glass side visible reflection of from about 50-90% (more preferably from about 60-80% and most preferably from about 65-75%) and visible transmission of from about 10-50% (more preferably from about 20-40%, and most preferably from about 25-35%). The high reflectance values are achieved, despite no metallic reflective layers, by way of the large refractive index differences between adjacent layers in the coating 150 in combination with the layer thickness values discussed herein. In certain example embodiments, the glass side reflectance (reflectance measured from the glass 1 side of the mirror) and the film side reflectance (reflectance measured from the film 150 side of the mirror) may be substantially symmetric (e.g., the glass side reflectance and film side reflectance of the mirror may differ by no more than about 10%). The refractive index and thickness values herein may also be tailored to allow transmitted and reflected color values (e.g., a* and/or b* color values) to be substantially neutral. The dielectric mirrors 100 may be first or second surface mirrors in certain example embodiments. The dielectric mirror 100 may be used, for example, as a beamsplitter. The mirrors 100 may or may not be heat treated (e.g., thermally tempered and/or thermally bent) in certain example embodiments. In certain example instances, such dielectric mirrors 100 may be used in consumer, commercial and/or digital signage applications such as picture frames, bathroom mirrors, TVs, and/or electronic devices. Theses mirrors may be used for electronic mirrors or hidden TVs for consumers, security, commercial, and/or digital signage applications. In certain electronic applications, when the display is on, the screen image can be viewed through the glass 1, and when the display is off the mirror 100 has the appearance of a mirror, given the reflectance and visible transmission values of the mirror discussed herein.

In certain example embodiments of this invention, transparent dielectric layer 2 of or including niobium oxide may be from about 70-140 nm thick, more preferably from about 80-130 nm thick, even more preferably from about 90-120 nm thick, with an example thickness being about 105 nm. In certain example embodiments of this invention, transparent dielectric layer 4 of or including niobium oxide may be from about 20-90 nm thick, more preferably from about 30-80 nm thick, even more preferably from about 40-65 nm thick, with an example thickness being about 52 nm. Similarly, in certain example embodiments of this invention, transparent dielectric layer 6 of or including niobium oxide may be from about 20-90 nm thick, more preferably from about 30-80 nm thick, even more preferably from about 40-70 nm thick, with an example thickness being about 54 nm. To realize the desired reflectance and transmission values herein, niobium oxide based layer 2 is preferably substantially thicker than each of niobium oxide based layers 4 and 6. For example, in certain example embodiments, niobium oxide based layer 2 is at least about 10 nm thicker (more preferably at least about 25 nm thicker, and most preferably at least about 40 nm thicker) than one or both of niobium oxide based layers 4 and/or 6.

In certain example embodiments of this invention, transparent dielectric layer 3 of or including silicon oxide may be from about 30-140 nm thick, more preferably from about 40-120 nm thick, even more preferably from about 60-120 nm thick, even more preferably from about 75-100 nm thick, with an example thickness being about 88 nm. Similarly, in certain example embodiments of this invention, transparent dielectric layer 5 of or including silicon oxide may be from about 30-140 nm thick, more preferably from about 40-120 nm thick, even more preferably from about 60-120 nm thick, even more preferably from about 75-100 nm thick, with an example thickness being about 88 nm. Thus, the silicon oxide based layers 3 and 5 may be of substantially the same thickness in certain example embodiments (i.e., the thickness of silicon oxide based layers 3 and 5 differs by no more than about 20 nm, more preferably by no more than about 10 nm, in certain example embodiments). And in certain example embodiments, one or both of silicon oxide based layers 3 and/or 5 are at least about 10 nm (more preferably at least about 15 nm) thinner than niobium oxide based layer 2, and is/are at least about 10 nm (more preferably at least about 20 nm) thicker than niobium oxide based layer(s) 4 and/or 6.

Figure 2:
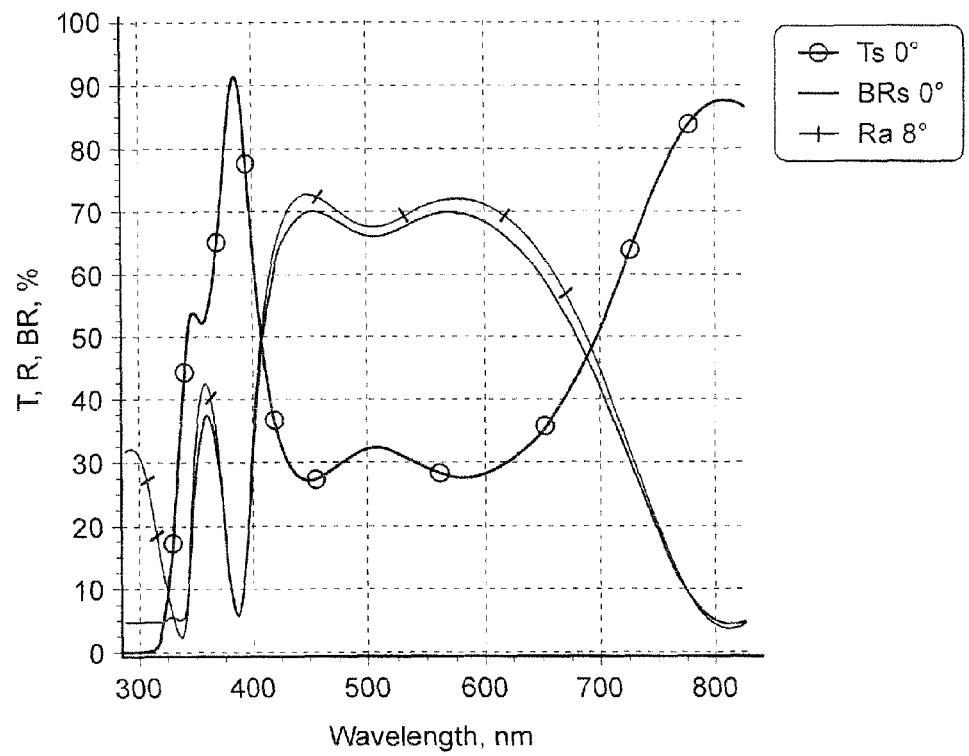
FIG. 2 is a modeled wavelength (nm) versus visible transmission (Ts), film side reflection (BRs), glass side reflection (Ra) graph illustrating optical characteristics of a dielectric mirror according to an example of the FIG. 1 embodiment.
Figure 3:
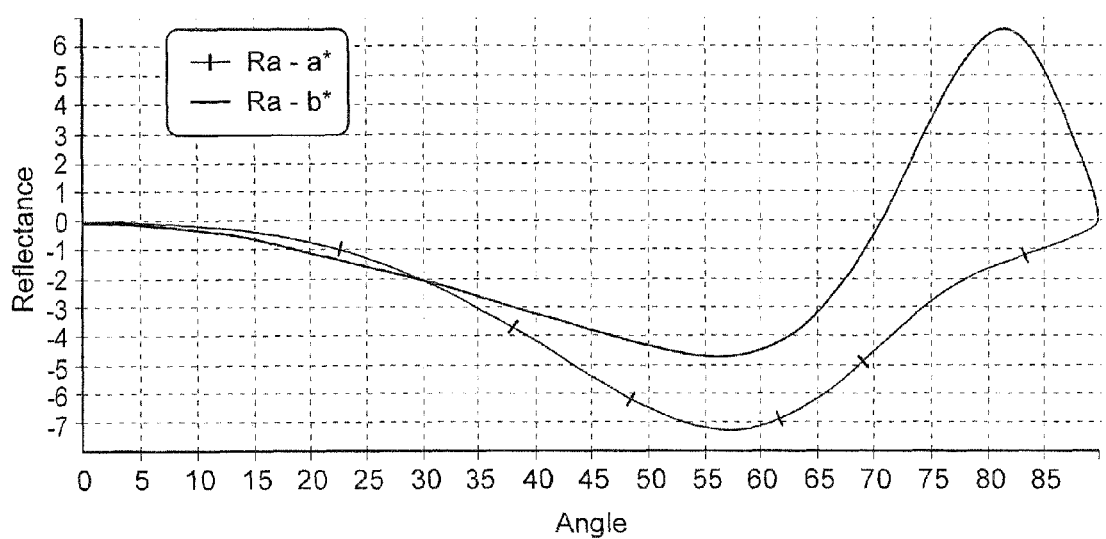
FIG. 3 is a modeled angle (degrees) versus glass side reflective a* and b* color values graph, illustrating angular distribution of reflected colors of a dielectric mirror according to the example of the FIG. 1 embodiment.

An example dielectric mirror 100 was made as follows:
glass substrate 1
niobium oxide layer 2: 105 nm thick
silicon oxide layer 3: 88 nm thick
niobium oxide layer 4: 53 nm thick
silicon oxide layer 5: 88 nm thick
niobium oxide layer 6: 53 nm thick Optical properties of this example mirror are shown in FIGS. 2-3. FIG. 2 is a modeled wavelength (nm) versus visible transmission (Ts), film side reflection (BRs), glass side reflection (Ra) graph illustrating optical characteristics of this example dielectric mirror; and FIG. 3 is a modeled angle (degrees) versus glass side reflective a* and b* color values graph, illustrating angular distribution of reflected colors of this example dielectric mirror. The following visible optical values (L*, visible transmission values (TY or TaY), visible reflectance values (film side RfY or BRa, glass side RgY or Ra), and visible transmissive/reflective color values a* and b*) were measured:

TABLE 1

|  | a* | b* | L* | Y |
|---|---|---|---|---|
| Transmission: | −0.53 | +0.17 | 62.42 | 30% |
| Glass side reflectance (Rg): | −0.04 | −0.08 | 86.88 | 70% |
| Film side reflectance (Rf): | −1.28 | +0.01 | 85.85 | 68% |

Thus, it can be seen from the above Table 1 that the dielectric mirror had a visible transmission of 30%, a visible glass side reflectance of 70%, and a visible film side reflectance of 68% (the glass side and film side reflectance was substantially the same). It can also be seen that the mirror had neutral (from −2 to +2) glass side and film side reflective color values a* and b*. These were measured in accordance with Ill. C, 2 degree. And it can be seen in FIG. 3 that the angular distribution of the reflected a* and b* color values showed no large fluctuations at angles from about 0-30 degrees.

An advantage of the mirror is that ultraviolet (UV) transmission at 385 nm is at least about 70%, more preferably at least about 75%, and most preferably at least about 80% or 85%, as shown in FIG. 2 (note the Ts curve in FIG. 2 at 385 nm), although the visible transmission is less than about 40%, more preferably less than about 35% as also shown in FIG. 2. This high UV transmission, coupled with the low visible transmission and high reflectance values, allows the mirror to be particularly suited for certain applications where high UV is desired.

While a layer, layer system, coating, or the like, may be said to be "on" or "supported by" a substrate, layer, layer system, coating, or the like, other layer(s) may be provided therebetween. Thus, for example, the coatings or layers described above may be considered "on" and "supported by" the substrate and/or other coatings or layers even if other layer(s) are provided therebetween.

In example embodiments of this invention there is provided a dielectric mirror including a glass substrate supporting a coating, the coating comprising moving away from the glass substrate: a first transparent dielectric high refractive index layer comprising niobium oxide, the first transparent dielectric high refractive index layer having a thickness of from about 70-140 nm; a second transparent dielectric low refractive index layer comprising silicon oxide, the second transparent dielectric low refractive index layer having a thickness of from about 30-140 nm; a third transparent dielectric high refractive index layer comprising niobium oxide; a fourth transparent dielectric low refractive index layer comprising silicon oxide; a fifth transparent dielectric high index layer comprising niobium oxide; wherein the first transparent dielectric high index layer comprising niobium oxide is at least 10 nm thicker than one or both of the third transparent dielectric high refractive index layer comprising niobium oxide and/or the fifth transparent dielectric high index layer comprising niobium oxide; wherein the coating does not contain any metallic reflective layer; and wherein the dielectric mirror has a visible film side reflectance and/or a visible glass side reflectance of from about 50-90%, and visible transmission of from about 20-40%.

In the mirror of the immediately preceding paragraph, the first transparent dielectric high index layer comprising niobium oxide may be at least 10 nm thicker than both of the third transparent dielectric high refractive index layer comprising niobium oxide and the fifth transparent dielectric high index layer comprising niobium oxide.

In the mirror of any of the preceding two paragraphs, the first transparent dielectric high index layer comprising niobium oxide may be at least 25 nm thicker than one or both of the third transparent dielectric high refractive index layer comprising niobium oxide and/or the fifth transparent dielectric high index layer comprising niobium oxide.

In the mirror of any of the preceding three paragraphs, the first transparent dielectric high index layer comprising niobium oxide may be at least 25 nm thicker than both of the third transparent dielectric high refractive index layer comprising niobium oxide and the fifth transparent dielectric high index layer comprising niobium oxide.

In the mirror of any of the preceding four paragraphs, one, two or all three of the first, third and fifth layers may consist essentially of niobium oxide.

In the mirror of any of the preceding five paragraphs, the dielectric mirror may have a visible film side reflectance of from about 60-80% and a visible glass side reflectance of from about 60-80%.

In the mirror of any of the preceding six paragraphs, the dielectric mirror may have a visible transmission of from about 25-35%.

In the mirror of any of the preceding seven paragraphs, the third transparent dielectric high refractive index layer comprising niobium oxide may be from about 30-80 nm thick.

In the mirror of any of the preceding eight paragraphs, the fourth transparent dielectric low refractive index layer comprising silicon oxide may be from about 40-120 nm thick.

In the mirror of any of the preceding nine paragraphs, the fifth transparent dielectric high refractive index layer comprising niobium oxide may be from about 30-80 nm thick.

In the mirror of any of the preceding ten paragraphs, the coating may consist essentially of the first, second, third, fourth and fifth layers.

In the mirror of any of the preceding eleven paragraphs, the first transparent dielectric high refractive index layer comprising niobium oxide may directly contact the glass substrate.

In the mirror of any of the preceding twelve paragraphs, the second transparent dielectric low refractive index layer comprising silicon oxide may be located between and directly contacting the first transparent dielectric high refractive index layer comprising niobium oxide and the third transparent dielectric high refractive index layer comprising niobium oxide.

In the mirror of any of the preceding thirteen paragraphs, the fourth transparent dielectric low refractive index layer comprising silicon oxide may be located between and directly contacting the third transparent dielectric high refractive index layer comprising niobium oxide and the fifth transparent dielectric high refractive index layer comprising niobium oxide.

In the mirror of any of the preceding fourteen paragraphs, the first, second, third, fourth, and fifth layers may be sputter-deposited layers.

In the mirror of any of the preceding fifteen paragraphs, each of the second and fourth transparent dielectric low refractive index layers comprising silicon oxide may be doped with aluminum and/or nitrogen.

In the mirror of any of the preceding sixteen paragraphs, the first, third, and fifth transparent dielectric high refractive index layers comprising niobium oxide may have a refractive index of from about 2.15 to 2.5, more preferably from about 2.2 to 2.4.

In the mirror of any of the preceding seventeen paragraphs, the second and fourth transparent dielectric low refractive index layers comprising silicon oxide may have a refractive index of from about 1.4 to 1.7, more preferably from about 1.4 to 1.6.

In the mirror of any of the preceding eighteen paragraphs, the second and fourth transparent dielectric low refractive index layers comprising silicon oxide may each be: (i) thinner than the first transparent dielectric high refractive index layer comprising niobium oxide, and (ii) thicker than both the third and fifth transparent dielectric high refractive index layers comprising niobium oxide.

In the mirror of any of the preceding nineteen paragraphs, the mirror may have an ultraviolet (UV) transmission at 385 nm of at least about 75%, more preferably of at least about 80%.

In the mirror of any of the preceding twenty paragraphs, the mirror may be heat treated (e.g., thermally tempered).

In the mirror of any of the preceding twenty-one paragraphs, the fifth layer may be the outermost layer of the coating.

In the mirror of any of the preceding twenty-two paragraphs, the mirror may have neutral glass side and/or film side reflective color values a* and b*, each of the glass side and/or film side reflective a* and b* values being from about −2 to +2.

In example embodiments of this invention, there is provided a mirror including a substrate supporting a coating, the coating comprising moving away from the substrate: a first dielectric layer having a thickness of from about 70-140 nm and a refractive index (n) of from about 2.15 to 2.5; a second dielectric layer comprising silicon oxide; a third dielectric layer having a refractive index of from about 2.15 to 2.5; a fourth dielectric layer comprising silicon oxide; a fifth dielectric layer having a refractive index of from about 2.15 to 2.5; wherein the first dielectric layer is at least 10 nm thicker than one or both of the third dielectric layer and/or the fifth dielectric layer; wherein the coating does not contain any metallic reflective layer; and wherein the mirror has a visible film side reflectance and/or a visible glass side reflectance of from about 50-90%, and visible transmission of from about 20-40%.

In the mirror of the immediately preceding paragraph, (i) at least one of the first, third and fifth dielectric layers may comprise or consist essentially of niobium oxide, and/or (ii) at least one of the first, third and fifth dielectric layers may comprise or consist essentially of titanium oxide.

In the mirror of any of the preceding two paragraphs, the first dielectric layer may be at least 10 nm thicker than both of the third and fifth dielectric layers.

In the mirror of any of the preceding three paragraphs, the coating may consist essentially of the first, second, third, fourth and fifth layers.

In the mirror of any of the preceding four paragraphs, the second and fourth dielectric layers comprising silicon oxide may each be: (i) thinner than the first dielectric layer, and (ii) thicker than both the third and fifth dielectric layers.

In the mirror of any of the preceding five paragraphs, the mirror may have an ultraviolet (UV) transmission at 385 nm of at least about 75%, more preferably of at least about 80% or 85%.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A dielectric mirror including a glass substrate supporting a coating, the coating consisting essentially of moving away from the glass substrate:
   a first transparent dielectric high refractive index layer comprising niobium oxide, the first transparent dielectric high refractive index layer having a thickness of from about 70-140 nm;
   a second transparent dielectric low refractive index layer comprising silicon oxide, the second transparent dielectric low refractive index layer having a thickness of from about 30-140 nm;
   a third transparent dielectric high refractive index layer comprising niobium oxide;
   a fourth transparent dielectric low refractive index layer comprising silicon oxide;
   a fifth transparent dielectric high index layer comprising niobium oxide;
   wherein the first transparent dielectric high refractive index layer comprising niobium oxide is at least 10 nm thicker than at least one of the third transparent dielectric high refractive index layer comprising niobium oxide and the fifth transparent dielectric high index layer comprising niobium oxide;
   wherein the coating does not contain any metallic reflective layer; and
   wherein the dielectric mirror has a visible film side reflectance and a visible glass side reflectance of from about 50-90%, and at all wavelengths from 500-600 nm has a visible transmission of from about 20-40%.

2. The mirror of claim 1, wherein the first transparent dielectric high index layer comprising niobium oxide is at least 10 nm thicker than both of the third transparent dielectric high refractive index layer comprising niobium oxide and the fifth transparent dielectric high index layer comprising niobium oxide.

3. The mirror of claim 1, wherein the first transparent dielectric high index layer comprising niobium oxide is at least 25 nm thicker than at least one of the third transparent dielectric high refractive index layer comprising niobium oxide and the fifth transparent dielectric high index layer comprising niobium oxide.

4. The mirror of claim 1, wherein the first transparent dielectric high index layer comprising niobium oxide is at least 25 nm thicker than both of the third transparent dielectric high refractive index layer comprising niobium oxide and the fifth transparent dielectric high index layer comprising niobium oxide.

5. The mirror of claim 1, wherein the dielectric mirror has a visible film side reflectance of from about 60-80% and a visible glass side reflectance of from about 60-80%.

6. The mirror of claim 1, wherein the dielectric mirror has a visible transmission of from about 25-35%.

7. The mirror of claim 1, wherein the third transparent dielectric high refractive index layer comprising niobium oxide is from about 30-80 nm thick.

8. The mirror of claim 1, wherein the fourth transparent dielectric low refractive index layer comprising silicon oxide is from about 40-120 nm thick.

9. The mirror of claim 1, wherein the fifth transparent dielectric high refractive index layer comprising niobium oxide is from about 30-80 nm thick.

10. The mirror of claim 1, wherein the first transparent dielectric high refractive index layer comprising niobium oxide directly contacts the glass substrate.

11. The mirror of claim 1, wherein the second transparent dielectric low refractive index layer comprising silicon oxide is located between and directly contacting the first transparent dielectric high refractive index layer comprising niobium oxide and the third transparent dielectric high refractive index layer comprising niobium oxide.

12. The mirror of claim 1, wherein the fourth transparent dielectric low refractive index layer comprising silicon oxide is located between and directly contacting the third transparent dielectric high refractive index layer comprising niobium oxide and the fifth transparent dielectric high refractive index layer comprising niobium oxide.

13. The mirror of claim 1, wherein the first, second, third, fourth, and fifth layers are sputter-deposited layers.

14. The mirror of claim 1, wherein each of the second and fourth transparent dielectric low refractive index layers comprising silicon oxide are doped with aluminum.

15. The mirror of claim 1, wherein the first, third, and fifth transparent dielectric high refractive index layers comprising niobium oxide have a refractive index of from about 2.15 to 2.5.

16. The mirror of claim 1, wherein the first, third, and fifth transparent dielectric high refractive index layers comprising niobium oxide have a refractive index of from about 2.2 to 2.4.

17. The mirror of claim 1, wherein the second and fourth transparent dielectric low refractive index layers comprising silicon oxide have a refractive index of from about 1.4 to 1.7.

18. The mirror of claim 1, wherein the second and fourth transparent dielectric low refractive index layers comprising silicon oxide have a refractive index of from about 1.4 to 1.6.

19. The mirror of claim 1, wherein the second and fourth transparent dielectric low refractive index layers comprising silicon oxide are each: (i) thinner than the first transparent dielectric high refractive index layer comprising niobium oxide, and (ii) thicker than both the third and fifth transparent dielectric high refractive index layers comprising niobium oxide.

20. The mirror of claim 1, wherein the mirror has an ultraviolet (UV) transmission at 385 nm of at least about 75%.

21. The mirror of claim 1, wherein the mirror has an ultraviolet (UV) transmission at 385 nm of at least about 80%.

22. The mirror of claim 1, wherein the mirror is thermally tempered.

23. The mirror of claim 1, wherein the mirror has neutral glass side reflective color values a* and b*, each of the glass side reflective a* and b* values being from about −2 to +2.

24. The mirror of claim 1, wherein the mirror has neutral film side reflective color values a* and b*, each of the film side reflective a* and b* values being from about −2 to +2.

25. A mirror including a substrate supporting a coating, the coating consisting essentially of moving away from the substrate:
   a first dielectric layer having a thickness of from about 70-140 nm and a refractive index (n) of from about 2.15 to 2.5;
   a second dielectric layer comprising silicon oxide;
   a third dielectric layer having a refractive index of from about 2.15 to 2.5;
   a fourth dielectric layer comprising silicon oxide;
   a fifth dielectric layer having a refractive index of from about 2.15 to 2.5;
   wherein the first dielectric layer is at least 10 nm thicker than one or both of the third dielectric layer and/or the fifth dielectric layer;
   wherein the coating does not contain any metallic reflective layer;
   wherein the coating consists essentially of the first, second, third, fourth and fifth layers,
   wherein the mirror has at least one of a visible film side reflectance of from about 50-90% and a visible glass side reflectance of from about 50-90%, and
   wherein the mirror at all wavelengths from 500-600 nm has a visible transmission of from about 20-40%.

26. The mirror of claim 25, wherein at least one of the first, third and fifth dielectric layers comprises niobium oxide.

27. The mirror of claim 25, wherein at least one of the first, third and fifth dielectric layers comprises titanium oxide.

28. The mirror of claim 25, wherein the first dielectric layer is at least 10 nm thicker than both of the third and fifth dielectric layers.

29. The mirror of claim 25, wherein the second and fourth dielectric layers comprising silicon oxide are each: (i) thinner than the first dielectric layer, and (ii) thicker than both the third and fifth dielectric layers.

30. The mirror of claim 25, wherein the mirror has an ultraviolet (UV) transmission at 385 nm of at least about 75%.

31. The mirror of claim 25, wherein the mirror has neutral glass side and film side reflective color values a* and b*, the glass side reflective color values a* and b* and the film side reflective reflective color values a* and b* each being from about −2 to +2.

* * * * *